United States Patent [19]
Wisshaupt

[11] Patent Number: 5,048,772
[45] Date of Patent: Sep. 17, 1991

[54] DEVICE FOR ROLL ATTITUDE CONTROL OF A FIN-STABILIZED PROJECTILE

[75] Inventor: Daniel Wisshaupt, Orléans la source, France

[73] Assignee: Thomson-Brandt Armements, Boulogne, France

[21] Appl. No.: 643,899

[22] Filed: Jan. 22, 1991

[30] Foreign Application Priority Data

Jan. 26, 1990 [FR] France ................ 90 00945

[51] Int. Cl.⁵ .................................. F42B 10/00
[52] U.S. Cl. ............................ 244/3.23; 244/3.21
[58] Field of Search ............... 244/3.21, 3.23–3.3

[56] References Cited

U.S. PATENT DOCUMENTS

| | | | |
|---|---|---|---|
| 3,245,352 | 4/1966 | Summers | 244/3.21 |
| 3,260,205 | 7/1966 | Dietrich | 244/3.23 |
| 3,843,075 | 10/1974 | Weber et al. | 244/3.21 |
| 4,029,270 | 6/1977 | Niemeier | 244/3.21 |
| 4,052,024 | 10/1977 | Smith | 244/3.21 |
| 4,085,909 | 4/1979 | East et al. | 244/3.21 |
| 4,560,121 | 12/1985 | Terp | 244/3.28 |
| 4,648,567 | 3/1987 | Maudal | 244/3.24 |
| 4,964,593 | 10/1990 | Kranz | 244/3.24 |

FOREIGN PATENT DOCUMENTS 2226641 11/1974 France .
2608750 6/1988 France .
567708 10/1975 Switzerland .

*Primary Examiner*—Harold J. Tudor
*Attorney, Agent, or Firm*—Roland Plottel

[57] ABSTRACT

Simple roll control device for a rear fin stabilized projectile.

The base of each fin is attached by two articulations of which one is connected to a fixed drum while the other is connected to a ring which is free to turn through several degrees in either direction under the control of an actuator thus creating a projectile roll moment.

7 Claims, 2 Drawing Sheets

DEVICE FOR ROLL ATTITUDE CONTROL OF A FIN-STABILIZED PROJECTILE

BACKGROUND OF THE INVENTION

The present invention relates to a device for the roll attitude control of a fin-stabilized projectile.

Certain specific missions assigned to weapons systems rely on the principle of roll stabilization of the munitions implemented by these systems, requiring constant roll attitude control of the projectiles. In particular, this is the case of anti-tank flyover ammunition when the attack direction of the charge is no longer one and the same as the speed vector, and when the roll position has to be controlled so as to initiate the charge in a precisely known direction. This case also appears for anti-helicopter munitions when a stabilized roll guidance principle is selected, and when it becomes necessary to determine an angular reference and to control the roll of the projectile according to that reference.

Moreover, in some cases it is necessary to provide a particular roll evolution control upon these projectiles, for instance to generate a scanning movement by a fixed detector mounted on this type of device.

DESCRIPTION OF PRIOR ART

In prior art, it is possible to control the attitude of guided missiles by stabilizers which are specially designed for this purpose. The attitude on guided missiles such as these must be controlled according to three axes: yaw, roll and pitch; therefore these missiles feature several motors which are controlled separately to obtain the desired movements. This leads to heavy, complex and costly, devices.

SUMMARY OF THE INVENTION

The present invention aims at remedying this drawback in the case of a projectile already equipped with stabilization fins which are more or less plane, and for which only roll attitude control is desirable. It should be observed that a stabilizer arrangement such as this, mounted at the tail of the projectile, is necessary in any case to stabilize the munition and to prevent it from tipping by moving the application center of the aerodynamic forces to a point behind the center of gravity. Each of the stabilizing fins is thus contained normally within a meridian plane of the projectile, which is assumed to be generated by revolution. It then becomes possible to create a roll moment applying to the munition by rotating all the fins simultaneously and in the same direction about the longitudinal direction of each fin, located in the meridian plane originally containing the fin, that is, before this rotation. According to the present invention, this result can be obtained in a simple manner, by fitting each fin with a "foot" in the form of a base at right angles to the fin while each fin "foot" has a first point of attachment joined, either flexibly or articulated, to a fixed part in turn joined to the projectile body, and another point of attachment, separate from the first and joined, flexibly or by an articulated arrangement, to a common ring. This ring is mounted so as to rotate freely about the longitudinal axis of the projectile, with means provided to rotate the ring, within a limited angle, in one direction or the other. The result of this is to cause each fin to rotate about an axis located in the fin plane and perpendicular to a base plane forming the fin "foot", thus causing the creation of a roll moment for the projectile, in one direction or the other.

It is advantageous that the first point of attachment is joined to a fixed drum having a diameter approximately equal to that of the rotary ring. In any case the invention will be clearly understood and its advantages and other features will become evident from the following description of a non-limitative example of the preferred embodiment.

BRIEF DESCRIPTION OF THE DRAWINGS

This description makes reference to the schematic diagram attached in which.

DESCRIPTION OF THE PREFERRED EMBODIMENTS

Figure 1:
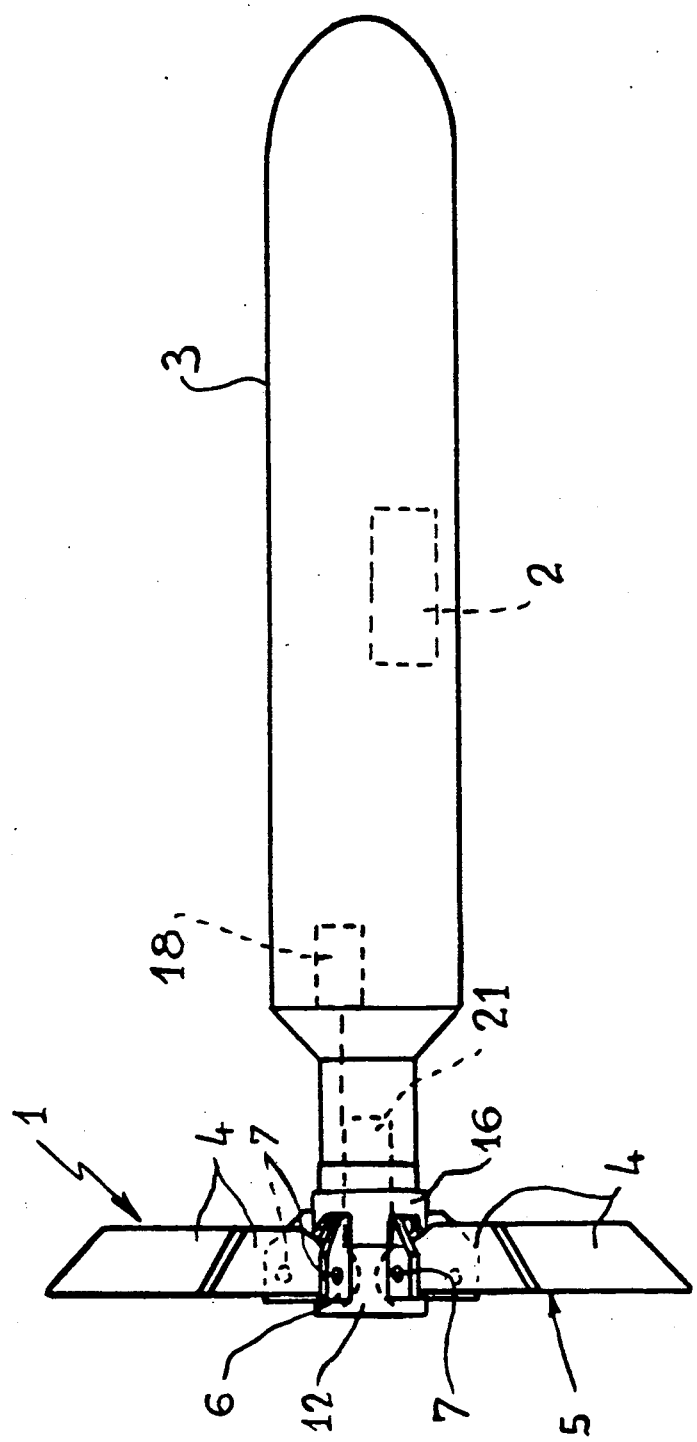
FIG. 1 is a general simplified view of the projectile.

In reference to FIG. 1, this concerns a simple projectile of the artillery projectile or infantry weapon type (anti-tank munition or other), conventionally stabilized by rear stabilizer 1. However, this projectile is equipped with a computer 2 located within its main body 3 which transmits roll stabilization orders to a roll actuator including, generally, the rear stabilizer and the device orienting the blades 4 of fins 5 of this tail arrangement, shown in greater detail in FIG. 2. Computer 2 receives information from one or several roll sensors featuring a rate gyro or optical sensors for instance, not represented in the drawing.

Figure 2:
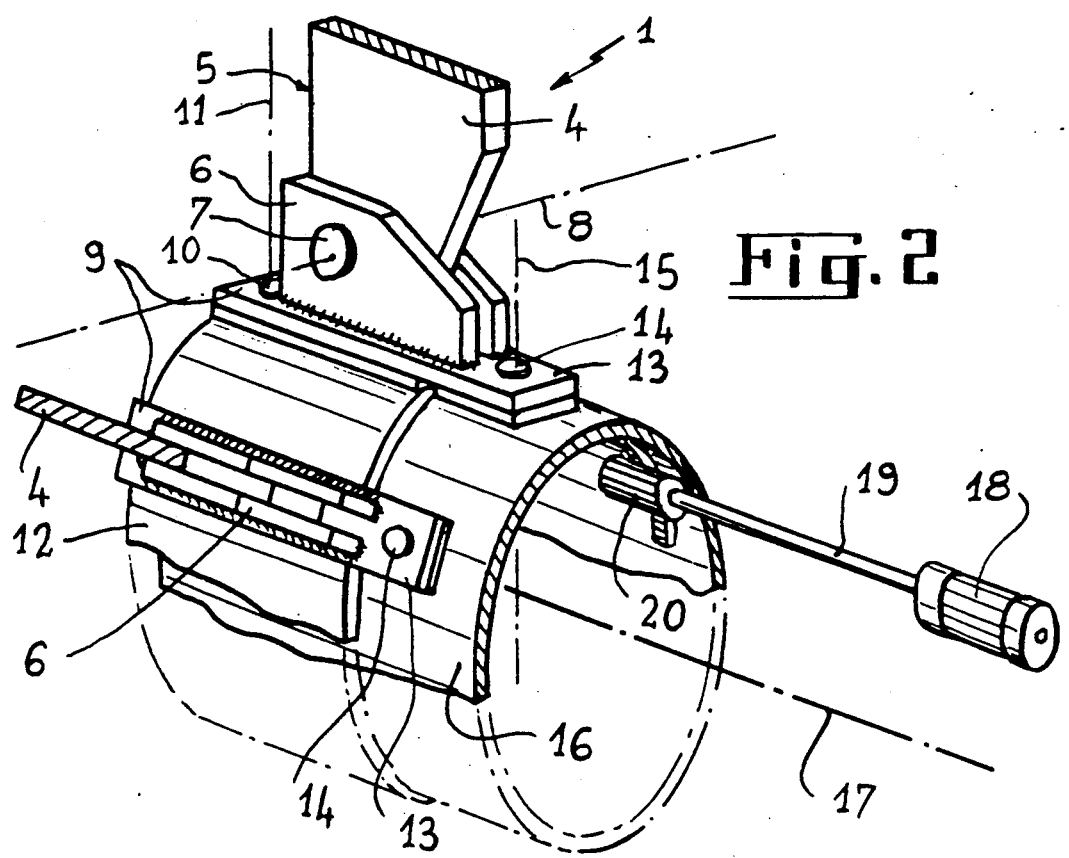
FIG. 2 is a perspective view of the device with its fins in their original meridian plane.

More particularly in reference to FIG. 2, each fin 5 traditionally consists of an extended plane 4 and a base or "foot" 6. The base of each fin is attached, again in the usual manner, by an articulation of axis 8 perpendicular to the fin plane on foot 6 in such a way that the fin may extend at right angles to the projectile after the ejection of the latter from the launching tube during the firing of the munitions.

In the present invention, each foot of fin 6 is attached on a slightly articulated basis to the body 3 of the projectile. To do this, the first end 9 of this foot 6 is attached by an articulation 10 on axis 11 parallel to the longitudinal axis of extended fins 4 to rear drum 12 joined to the projectile body while the other end 13 of foot 6 is attached by another articulation 14 on axis 15 parallel to aforementioned axis 11 to a ring 16 more or less of the same diameter as fixed drum 12 but which is mounted free to rotate on body 3 of the projectile and about its longitudinal axis 17. Articulation 14 has sufficient clearance for the flexibility needed to permit some rotation of ring 16 in either direction.

From its resting position of FIG. 2, for which the fins 4 are all oriented according to the meridian planes, ring 16 can turn through a few degrees in either direction, under the effect of an electric motor 18, controlled by computer 2 whose axis 19 drives a motor pinion 20. The toothing of this latter cooperates with a gearing provided on the inner surface of ring 16.

Figure 3:
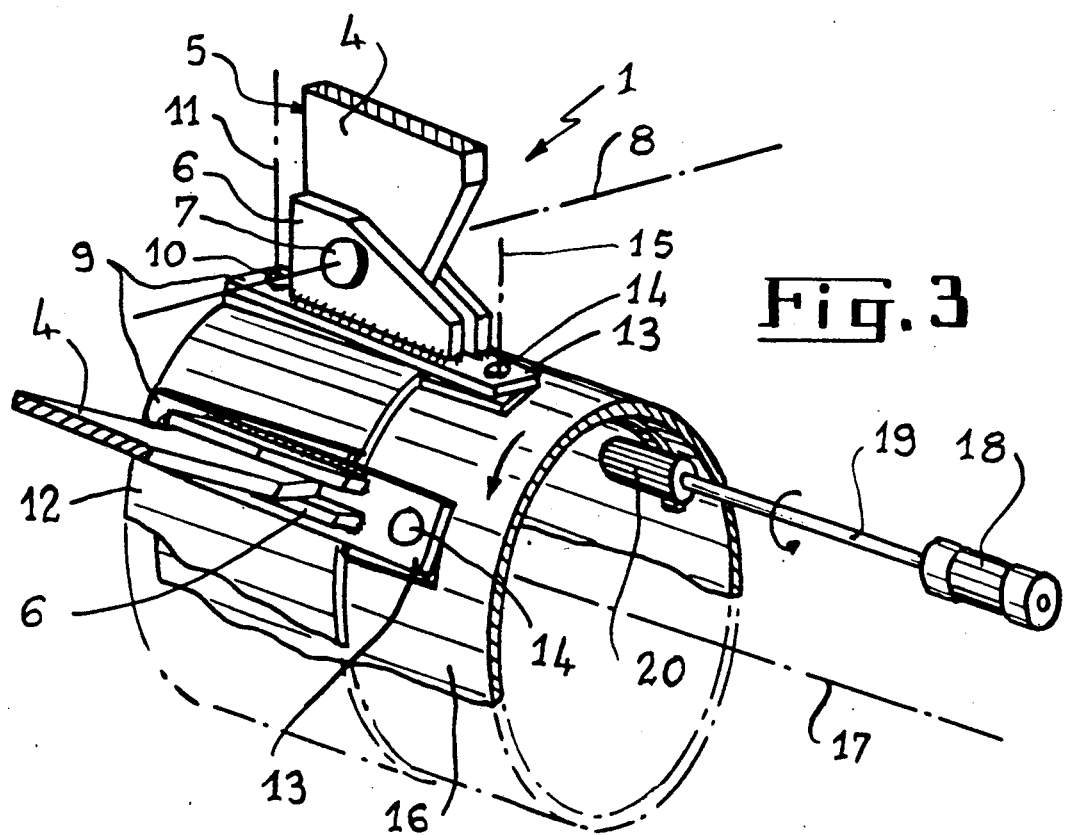
FIG. 3 shows the same device with the fins in a position creating a roll moment.

FIG. 3 also shows that the rotation of axis 19 of motor 18 will cause the rotation of ring 16 and consequently the simultaneous rotation of all the fins 5 about an axis located in their plane 4 more or less perpendicular to axis 17 of the projectile. Although this rotation is of a few degrees at the most, it creates a moment according to the roll axis of the projectile; this allows the roll to be controlled in order to conform to the instructions supplied by computer 2.

Instead of a stabilization indexed with respect to the ground, the computer 2 can also control a particular evolution in roll, such as scanning; this is done through a set succession of orders.

This roll attitude control is not in conflict with a stabilizer extending system enabling the munition to enter the gauge of the weapon used for its launching: the device which is being described here does not take any room outside of the projectile calibre.

This invention is not limited to the example described above. The number of stabilizer fins given is arbitrary. Motor 18 can be replaced by an actuator or a similar actuating device. Instead of being an electrical actuator, it could be a pneumatic actuator which would then have the advantage of being able to draw upon the pressure generated in the cruise motor 21 located in the tail of the projectile. The relative positions of rotary ring 16 and fixed drum 12 can be reversed. In this case, ring 16 is placed behind drum 12 and not in front. The mechanical articulations 10 and 14, to simplify the design, can be replaced by flexible links such as spring blades, made of stainless steel for instance, while the projectile stabilizer can be fixed, etc.

I claim:

1. A roll control device for use in a projectile having a longitudinal axis, and external stabilizing fins, said device comprising a cylindrical part having an axis co-axial with the longitudinal axis of the projectile, said cylindrical part having a fixed part and a rotating part which can rotate around the longitudinal axis, a plurality of external stabilizing fins each fin is fitted on a foot, the foot having a first part rotationally fixed to an outer part of one of the cylindrical parts along an axis perpendicular to the longitudinal axis and a second part rotationally and loosely attached to an outer part of the other cylindrical part along an axis perpendicular to the longitudinal axis, and means being provided to rotate the rotating part of the cylindrical part in either direction in order to make each external stabilizing fin turn about an axis located in the fin plane, approximately perpendicular to the axis of the projectile thus driving said fins in one direction or the other.

2. The roll control device of claim 1, wherein the two parts of the cylindrical part have diameters approximately equal to one another.

3. The roll device of claim 2, wherein the foot is rotationally attached to the fixed part of the cylindrical part and rotationally and loosely attached to the rotating part of the cylindrical part.

4. Device according to claim 1, wherein the angle of rotation of the rotating cylindrical part is limited to a few degrees.

5. Device according to claim 3, wherein the angle of rotation of the rotating cylindrical part is limited to a few degrees.

6. Device according to claim 4, wherein the means to rotate the rotating cylindrical parts comprise and electric motor having a motor pinion driving a gearing fitted in the inner part of the rotating cylindrical part.

7. Device according to claim 5, wherein the means to rotate the rotating cylindrical parts comprise an electric motor having a motor pinion driving a gearing fitted in the inner part of the rotating cylindrical part.

* * * * *